UNITED STATES PATENT OFFICE.

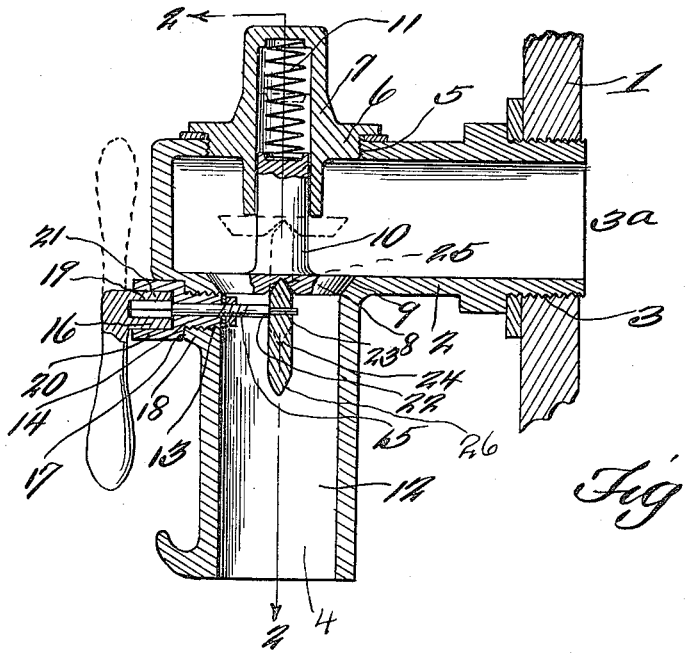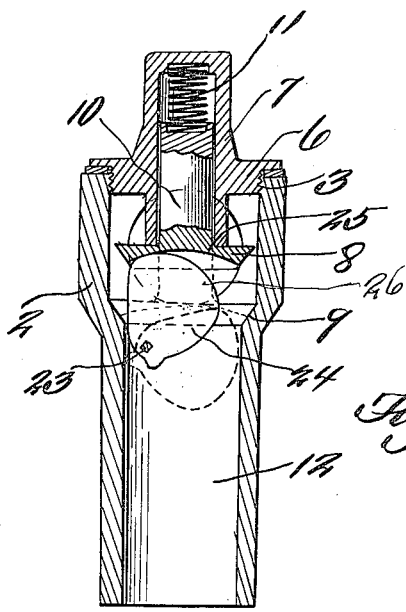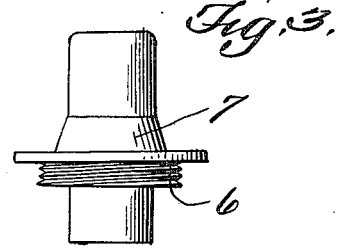

JOHN FOY MILTON, OF TEXARKANA, TEXAS.

VALVE.

1,080,991.   Specification of Letters Patent.   Patented Dec. 9, 1913.

Application filed January 15, 1913. Serial No. 742,117.

*To all whom it may concern:*

Be it known that I, JOHN F. MILTON, a citizen of the United States, residing at Texarkana, in the county of Bowie and State of Texas, have invented a new and useful Valve; and I do hereby declare the following to be a full, clear, and exact description of the invention, such as will enable others skilled in the art to which it appertains to make and use the same.

This invention relates to a new and useful valve, more especially adapted in connection with oil tank wagons.

As one of the objects of the invention, it is the aim to provide an automatically closing valve, including a nut in which the stem of the valve is mounted, there being a spring in the nut for automatically closing the valve, in combination with a crank mechanism for opening the valve. The box nut not only acting as a guide for a valve, but also constituting a housing for the spring, which automatically closes the valve.

Another object of the invention is the provision of an eccentric mechanism for raising the valve to an open position, there being guiding means or bushing for guiding and holding the shaft of the eccentric mechanism in place.

A feature of the valve is the provision of a recessed portion, with which the eccentric engages, to make it easier to open the valve by the eccentric, as well as holding the eccentric in place, in order that the same may have a true contact with the valve.

The invention comprises further features and combination of parts, as hereinafter set forth, shown in the drawings and claimed.

In the drawings:—Figure 1 is a sectional view through the improved valve construction showing the valve closed in full lines and raised in dotted lines. Fig. 2 is a sectional view on line 2—2 of Fig. 1, showing the valve raised. Fig. 3 is a detail view of the box nut.

Referring more particularly to the drawings, 1 designates a portion of an oil tank into which the valve casing 2 is threaded as at 3. The casing has an inlet 3ª and an outlet 4, and is provided with a threaded opening 5, into which the flange 6 of the box nut 7 is threaded. The valve 8 coöperates with the valve seat 9, for allowing the fluid to flow or cutting the same off. The valve 8 is constructed with a stem 10, which is mounted in and guided by the box nut, there being a spring 11 interposed between the stem 10 and the upper end of the box nut. The function of this spring is to automatically close or reseat the valve.

The portion 12 of the casing is constructed with a threaded opening 13. A bushing 14 is threaded into the opening 13, and not only acts as a bearing for both the shaft 15 and the valve handle 16, but also constitutes guides for said parts. The bushing 14 is formed with a shoulder 17, which frictionally engages the boss 18 of the portion 12 of the casing. The valve handle 16 is provided with a rectangular socket 19 which engages a correspondingly shaped end of the shaft 15, whereby the shaft may be rocked. Owing to the rectangular socket it will be noted that the valve handle may be detached or removed. The flange 20 of the bushing 14 engaging the sleeve 21 of the valve handle guides the handle in its movements. The end 22 of the shaft 15 is constructed with a rectangular extension 23, which enters a correspondingly shaped opening of an eccentric 24. The under face of the valve 8 is constructed with a V-shaped recess 25, which is engaged by the V-shaped periphery 26 of the eccentric. Owing to the engagement of the eccentric with the recess 25 of the valve, the eccentric is not only held in position on the shaft 15, but is also guided in its movement, in addition to insuring a true contact between the eccentric and the valve. To open the valve the handle 16 is operated in one direction, which causes the eccentric to lift or raise the valve, and when operated in a reverse direction, the short radius of the eccentric is moved to a position under the valve, in order that the spring 11 may automatically close the valve, as the eccentric is moved in such wise.

The invention having been set forth, what is claimed as new and useful is:—

1. In combination, a valve casing provided with an inlet end and a discharge end and provided with a valve seat therebetween, a tubular guide arranged axially with the discharge portion of the casing, a spring tensioned valve mounted in said guide and coöperating with the valve seat, the under face of the valve having a V-shaped recess, a bushing bearing threaded in the wall of the casing adjacent the valve seat and provided with a socket to receive the head of a detachable valve handle, a shaft mounted in said bushing bearing and provided with an enlargement at one end rectangular in cross section located in the socket to receive the head of the valve handle, said enlargement preventing movement of the shaft in one direction, means threaded on the shaft and engaging the inner end of said bushing bearing to prevent movement of the shaft in the opposite direction, a cam member replaceably mounted on the shaft and provided with a V-shaped periphery to engage the V-shaped recess of the valve and acting to lift the valve when the shaft is partially rotated, the V-shaped recess and the V-shaped periphery of the cam constituting combined means to retain the cam on the shaft.

2. In combination, a valve casing having a valve seat and provided with a threaded opening in registration with the outlet end of the casing, a box nut having a flange threaded in the threaded opening, a valve coöperating with the valve seat and provided with a stem to fit in the box nut, a spring in the box nut to act against the stem to automatically close the valve, the box nut constituting a guide for the stem, said valve having a V-shaped recess in its under surface, said casing having a replaceable bushing bearing, a shaft mounted in said bushing bearing and provided with a detachable valve handle, and a replaceable disk eccentrically mounted on one end of said shaft and provided with a V-shaped periphery to engage the V-shaped recess of the valve, said disk acting to lift the valve when the shaft is partially rotated, the V-shaped recess and the V-shaped periphery of the disk constituting combined means to retain the disk on the shaft.

In testimony whereof I have signed my name to this specification in the presence of two subscribing witnesses.

JOHN FOY MILTON.

Witnesses:
S. E. SOIN,
ALFRED MARSDAN.

---

Copies of this patent may be obtained for five cents each, by addressing the "Commissioner of Patents, Washington, D. C."